United States Patent [19]
McIngvale

[11] Patent Number: 5,716,032
[45] Date of Patent: Feb. 10, 1998

[54] UNMANNED AERIAL VEHICLE AUTOMATIC LANDING SYSTEM

[75] Inventor: Pat H. McIngvale, Huntsville, Ala.

[73] Assignee: United States of America as represented by the Secretary of the Army, Washington, D.C.

[21] Appl. No.: 641,133

[22] Filed: Apr. 22, 1996

[51] Int. Cl.$^6$ ............................................. B64C 13/20
[52] U.S. Cl. ..................... 244/185; 244/187; 244/190; 342/33; 364/423.009; 364/424.012; 364/428
[58] Field of Search ............................ 244/183, 184, 244/185, 189, 190, 186, 187; 364/423.099, 424.012, 428; 342/33

[56] References Cited

U.S. PATENT DOCUMENTS

| | | | |
|---|---|---|---|
| H628 | 4/1989 | McIngvale | 342/33 |
| 2,602,923 | 7/1952 | Frazier | 342/33 |
| 3,564,134 | 2/1971 | Rue et al. | 244/190 X |
| 4,385,354 | 5/1983 | Hornfeld et al. | 244/183 X |
| 5,235,513 | 8/1993 | Velger et al. | 244/183 X |
| 5,627,905 | 5/1997 | Sebok et al. | |

OTHER PUBLICATIONS

Technical Report RD-GC-92-34, entitled "Laboratory Evaluation of the Enhanced Automatic Target Cuer in the NLOS Missile Environment" by Pat H. McIngvale and Gregory H. Ingrum, published in Jan. 1993, by the U.S. Army Missile Command, Redstone Arsenal, Alabama.

*Primary Examiner*—William Grant
*Attorney, Agent, or Firm*—Howard G. Garner; Freddie M. Bush

[57] ABSTRACT

An automatic landing system for guiding an unmanned aerial vehicle along a predetermined path to a predetermined point on the ground. The system includes an image processing means resident in the motion compensation processor that computes aerial vehicle parameters. The computed parameters are altitude, changes in altitude, changes in pitch and yaw angles, roll angle and changes thereto, and changes in cross range and down range position. These computations are based on the movement of elements in the video of an imaging sensor onboard the aerial vehicle. The motion compensation processor also measures the distance (in pixels or picture elements) between two beacons placed a known distance apart on either side of the apparent touchdown point. A recovery control processor uses these parameters to compute both desired and actual altitude as a function of range from the vehicle to the apparent point of touchdown and to provide offset error in azimuth from the desired flight path to the landing area. The recovery control processor also computes commands for the automatic pilot on the unmanned aerial vehicle which corrects the aerial vehicle's flight path. The recovery control processor will normally be located with the motion compensation processor, either on the ground or on the aerial vehicle. The video image can either be brought to the ground over a data link or the image processing can be performed onboard the aerial vehicle.

5 Claims, 6 Drawing Sheets

FIGURE 6

UNMANNED AERIAL VEHICLE AUTOMATIC LANDING SYSTEM

DEDICATORY CLAUSE

The invention described herein may be manufactured, used, and licensed by or for the Government for governmental purposes without payment to me of any royalties thereon.

BACKGROUND OF THE INVENTION

The unmanned aerial vehicle automatic landing system relates to an automatic landing system that utilizes an image electronically generated by a sensor in the aerial vehicle. The sensor information is used to determine the actual flight path and guide the landing of the aerial vehicle along a predetermined path to a predetermined point.

A previous automatic landing system that I invented is disclosed in Statutory Invention Registration No. H628, published Apr. 4, 1989 and entitled "Universal Automatic Landing System for Remote Piloted Vehicles". This is an automatic system for landing remotely piloted vehicles, flying along a predetermined path, at a predetermined point. The system includes an autopilot carried by the flying vehicle for measuring the parameters of attitude, airspeed, and heading and for comparing the measured parameters with input parameters for the desired attitude, airspeed and heading. The autopilot adjusts the vehicle controls causing the vehicle to conform to the desired attitude, airspeed and heading when deviations therefrom are detected. The system includes a radar transmitter and receiver disposed on a stabilized double gimbal for continuously measuring the actual heading and distance from the vehicle to the radar transmitter and receiver. Control means are provided for receiving signals from the radar transmitter and receiver, computing actual and desired angles and altitude and for comparing the actual parameters with the desired parameters and for instructing the autopilot in overcoming any deviations detected therein.

Automatic landing systems may also use fixed beam microwaves and allow the guidance data to be fed to the automatic pilot rather than the aerial vehicle's instruments and otherwise be functionally equivalent to the standard instrument landing system used for manned flights. A problem with both of the above systems is the complexity and cost of the required ground equipment (radar or fixed beam microwave).

Another known system for the automatic recovery of aerial vehicles catches the aerial vehicle in a landing net structure that is surrounded by electro-optical sensors (either television, forward looking infrared, or similar device). In this type of system sensors measure the output of a beacon mounted on the nose of the aerial vehicle. When the beacon signal received by each sensor is equal, the aerial vehicle is centered on the correct course for recovery by the net. When the signals are unequal the errors are used as commands which are sent to the aerial vehicle through a ground control station to correct the aerial vehicle's flight path. This type of system can only be used for recovering remotely piloted aerial vehicles in a net.

The unmanned aerial vehicle automatic landing system overcomes the complex and limited aspects of these known systems by utilizing video image processing that allows for ground landings at a predetermined point, and by reducing the complexity of the ground equipment that is necessary for these previous systems.

SUMMARY OF THE INVENTION

An object of the invention is to provide a relatively simple system for automatically landing an unmanned aerial vehicle.

A further object of the invention is to provide an automatic landing system that generates and processes video images to model aerial vehicle flight parameters.

These and other objects, which will become apparent, are accomplished by the automatic landing system of the invention, which comprises a sensor mounted on an unmanned aerial vehicle which produces video images. These video images are processed by a motion compensation processor to determine the actual parameters of the aerial vehicle (altitude, delta altitude, changes in pitch and yaw angles, roll angle and changes thereto, and changes in its cross range and down range position). These parameters are then processed by a recovery control processor to obtain the necessary altitude and azimuth corrections needed. The correctional commands are sent to the automatic pilot on the aerial vehicle, causing the autopilot on the aerial vehicle to correct its course. The motion control processor and the recovery control processor can be on the ground and use the unmanned aerial vehicle's data link, or may be on the vehicle, as desired.

To implement the instant invention, only minimal hardware and software changes are necessary to a basic unmanned aerial vehicle. The motion compensation processor and recovery control processor must be added, and software changes are made to allow the automatic pilot to properly interpret some of the landing specific commands. A forward looking video imaging sensor must be added if the aerial vehicle lacks one. Although most unmanned aerial vehicles (particularly if intended for airborne surveillance and observation), may already have either a television camera or an infrared sensor (or both) mounted on a stabilized, movable platform that allows pointing the camera ahead, down and toward the rear of the air vehicle on command; this feature can be used advantageously, as will be explained later. In addition, at least a pair of landing beacons spaced a known distance apart must be provided.

DESCRIPTION OF THE PREFERRED EMBODIMENT

The unmanned aerial vehicle automatic landing system uses video image processing methods to provide sensor parameters from which the adherence of the aerial vehicle to a desired glide slope and heading can be provided for safely landing the vehicle. The image processing method involves image motion compensation for locating moving objects in video made from a moving sensor, on the vehicle. Basic elements of the landing system comprise motion compensation, flashing beacons, and a recovery control processor together with the elements of a basic UAV (unmanned aerial vehicle) system. The UAV system comprises an air vehicle with an imaging payload, automatic pilot, and airborne data link terminal, ground data link terminal and a ground control station. The motion compensation circuitry, and recovery control processor combine to measure, calculate and provide the necessary air vehicle parameters to provide the automatic landing capability that can be used to accurately and precisely land unmanned aerial vehicles.

Figure 1:
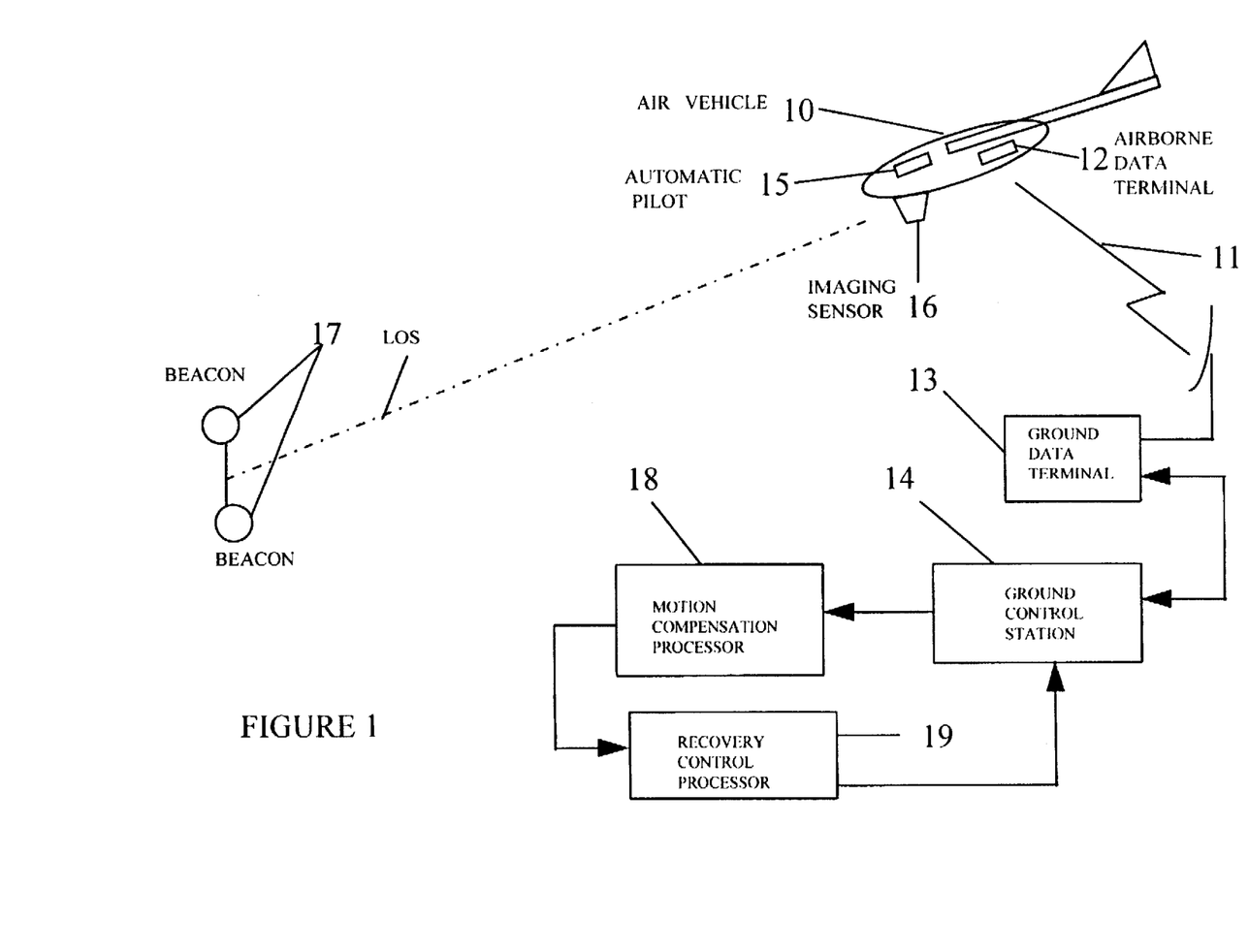
FIG. 1 is a single-line schematic view of a preferred embodiment of the invention, showing the principal components.

Referring now to the drawings wherein like numbers refer to like parts, FIG. 1 depicts an unmanned aerial vehicle landing system for an aerial vehicle 10. As shown, a radio frequency data link 11 is provided between an airborne data terminal 12 and a ground data terminal 13, enabling two way communication between an autopilot 15 on the aerial vehicle and a ground control station 14. An imaging sensor 16 is mounted on vehicle 10 and is pointed straight ahead along a line-of-sight, LOS, toward a pair of landing beacons 17 during the landing procedure. Beacons 17 are separated by a known distance and operate at a frequency consistent with the imaging sensor 16 and a motion compensation processor 18 and a recovery control processor 19. The motion compensation processor is coupled between the ground control station 14 and recovery control processor 19. At the landing site a ground controller or human operator (not shown) manually sets the proper approach parameters (pitch, yaw, airspeed, and altitude) into the ground control station prior to or at the time of the aerial vehicles landing approach. This places the unmanned vehicle in line-of-sight (LOS) with the landing beacons 17. The ground controller then either acquires the landing beacons 17 in the field of view of the sensor 16 manually, or allows the motion compensation processor 18 to do it automatically. Once the landing beacons are acquired by sensor 16, the vehicle enters the landing approach phase. Motion compensation processor 18 begins calculating the motion of pixels from frame to frame of the video signal received from sensor 16 via data terminal 12. Processor 18 computes the parameters that describe the motion of the imaging sensor, thereby computing the aerial vehicle 10 motion.

Figure 2A:
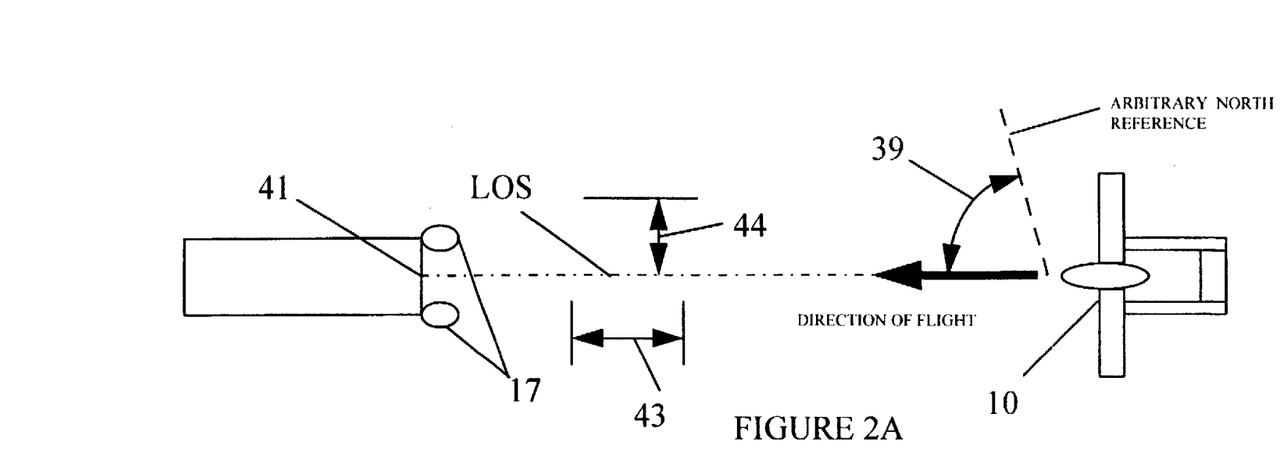
FIG. 2A is a schematic plan view of the landing flight path for an aerial vehicle using the automatic landing system of the invention.
Figure 2B:
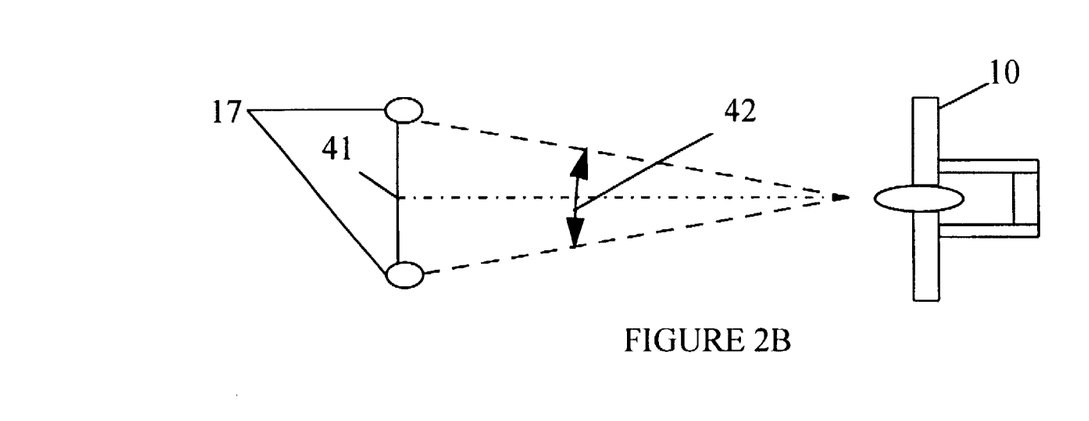
FIG. 2B is a plan view of the landing flight path shown in FIG. 2A, showing the angle 42 subtended by the landing beacons.

FIGS. 2A and 2B further illustrate the automatic landing of unmanned vehicle 10, disclosing a plan view and horizontal flight parameters. As the unmanned aerial vehicle 10 direction of flight approaches the landing site, the vehicle LOS with beacons 17 is established. An apparent touchdown point 41 is established and substantially maintained approximately equidistant from the two beacons. The motion compensation processor measures the distance (in pixels or picture elements) between the two beacons placed a known distance apart on either side of the apparent touchdown point 41. The actual point of touchdown is variable to a degree depending on the various flight parameters (airspeed, elevation, etc.) and external influences (wind, etc.) on the vehicle as it lands. The angle 42, subtended by the beacons 17, is substantially maintained in the imaging sensor's horizontal field of view. Yaw angle 39 may deviate to either side of the LOS but is automatically corrected by autopilot 15 to bring the vehicle back on the desired LOS track to the target—apparent landing point 41. Angle 42 gradually increases as the vehicle 10 approaches the apparent landing point 41.

Figure 3:
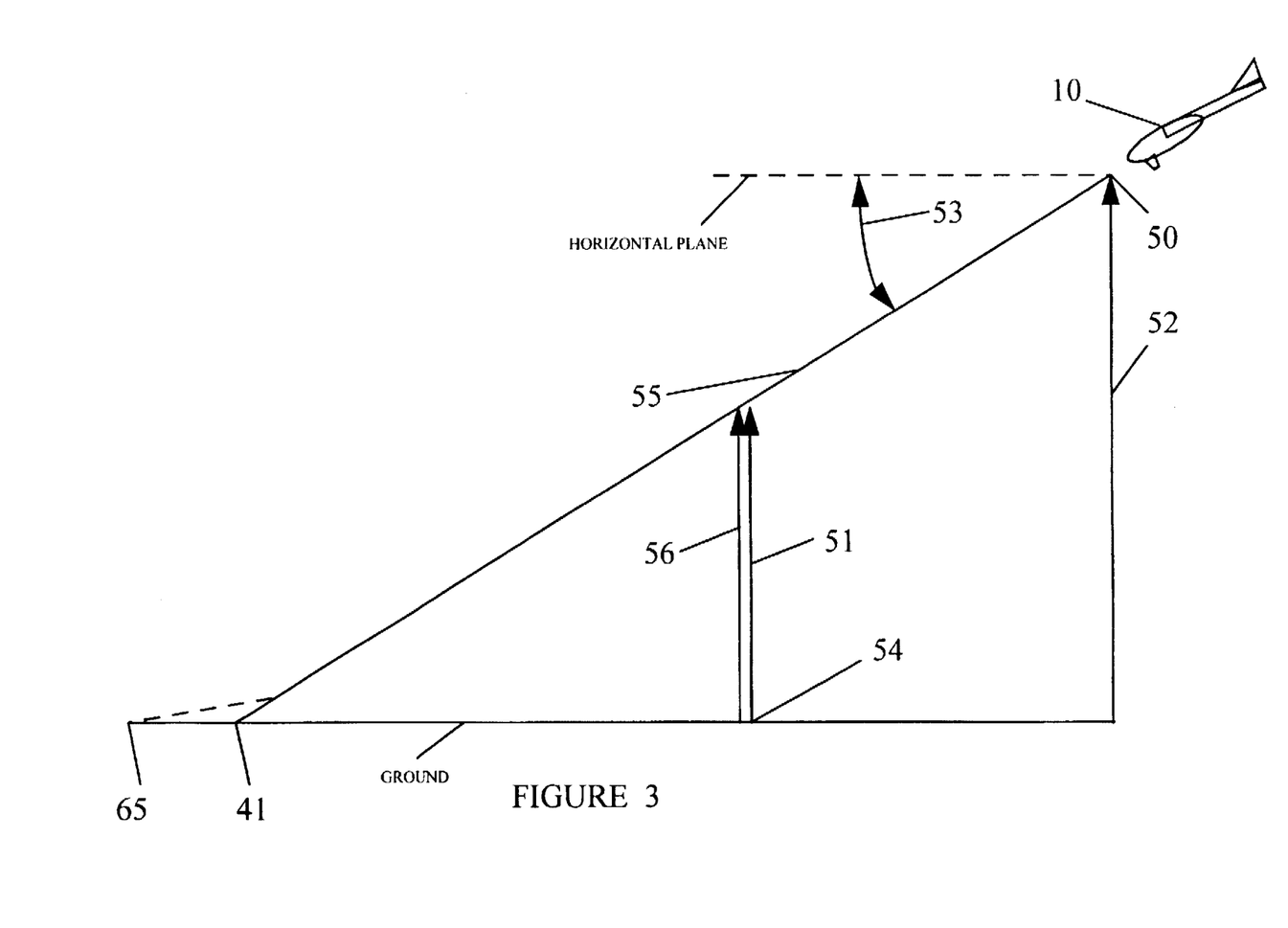
FIG. 3 is a side view of the landing flight path for an aerial vehicle using the automatic landing system of the invention.
Figure 4:
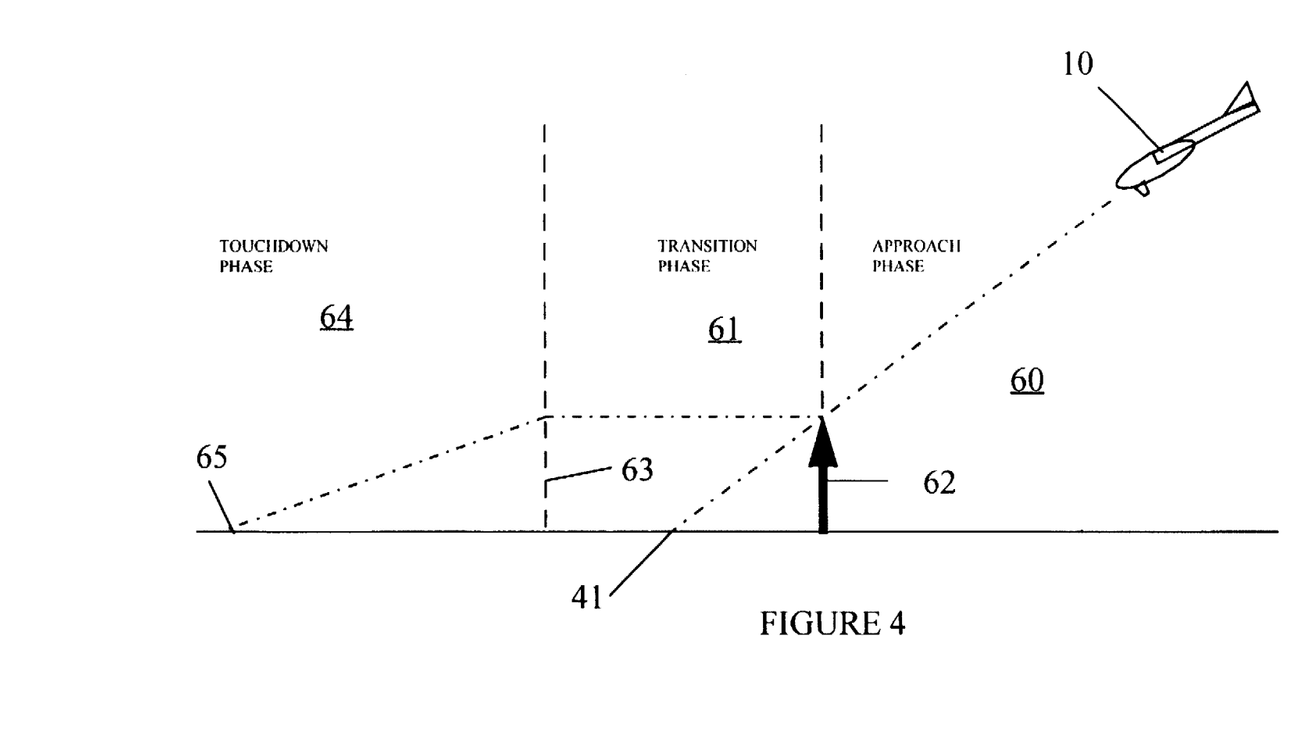
FIG. 4 is a diagram of the approach profile and velocity vectors of the invention in the landing phases.

As shown in the side view of FIG. 3, at some point 50 the landing beacons are acquired in the field of view of sensor 16 and the vehicle enters the approach phase (FIG. 4). Motion compensation processor 18 begins calculating the motion of pixels from frame to frame of the video, and computing the parameters that describe the motion of the imaging sensor. To accurately monitor and control the aerial vehicle's glide slope path 55 to touchdown it is necessary to know the horizontal or ground distance from the aerial vehicle's instantaneous altitude 51 at any instantaneous point 54 on the ground to the apparent touchdown point 41. Thus, the instantaneous altitude 51 is defined as the vertical distance from the aerial vehicle 10 to the ground at any instant during the landing approach. The distance 54 is calculated by motion compensation processor 18 using the beacons 17 as discussed in more detail hereinbelow. The desired flight path is set by initial altitude 52 and pitch angle 53 and the initial approach point 50. Thus, a location of point 50 on the ground (given as latitude and longitude, universal transverse Mercator projection, or Northing and Easting coordinates) plus the altitude 52 specifies the precise starting point and the angle 53 specifies the path to be followed in flying to the apparent touchdown point 41. Thus, at any time the desired altitude 56 and the instantaneous altitude 51 may or may not be identical. One means of monitoring the glide slope path is to measure the actual, instantaneous, vehicle altitude 51 above the ground at various ground distances from the apparent touchdown point 41, and compare it with the desired altitude 56 for these distances. The automatic pilot adjusts the delta pitch angle (53) and air vehicle velocity, through the normal air vehicle controls, to cause the desired altitude 56 and the actual altitude 51 to be the same and thereby maintain the desired glide slope path. Obviously these conditions—delta angle 53 and lines or distances 56 and 55 will have constantly changing values, as noted hereinabove.

The same situation exists for the yaw conditions—angle 39 and the tracking distances 43 and 44. These conditions are constantly changing by delta factors which contribute to the corrective inputs coupled back to the autopilot for correction according to well established procedures.

The landing phase is shown more clearly in the approach profile of FIG. 4. As noted hereinabove, once the landing beacons are acquired by sensor 16, the vehicle enters the landing approach phase 60. With primary reference to FIGS. 4 and 3, when the approach phase 60 is entered, the recovery control processor, using actual altitude from the motion compensation processor 18, determines when actual altitude 51 equals the desired transition altitude 62, and commands the autopilot to begin the transition. The transition phase of the landing 61 begins with the aerial vehicle's attitude changing from nose down to nose level. The altitude where this occurs is a function of the aerial vehicle's design and is a manually designated parameter to the required position computation means 75 (FIG. 5) in the recovery control processor 19. The autopilot reduces engine speed to idle and raises the aerial vehicle's nose to the level position. Throughout the transition phase 61 the recovery control processor 19 attempts to keep the actual altitude 51 equal to the transition altitude 62. It accomplishes this by commanding the autopilot 15 to raise the aerial vehicle's nose without changing the engine speed when the actual altitude 51 goes below the desired altitude 62. While the imaging sensor (payload) has been commanded to point ahead for the approach to this point, it will now utilize the ability to point its line of sight (LOS) downward in such a way that the beacons are still located in the center of the image even though the nose of the aircraft no longer points toward them. As the aircraft moves into the transition phase 61 the aircraft will pass over the beacons and past them so the LOS of the sensor will move from its original straight ahead position to a final position where it is pointing backward to keep the beacons in sight until touchdown or shortly before. This ability to move the sensor line of sight on command to point in a desired direction is a feature that is required and designed into all such units being manufactured for unmanned aerial vehicles so it doesn't constitute any new technology or designs.

Eventually, the aerial vehicle's nose is brought to an attitude where the wing begins to stall and the actual altitude begins to decrease, independently of any control movement by the autopilot 15. This marks the beginning at dashed line 63 of the touchdown phase 64. From this point until actual touchdown at touchdown point 65, the autopilot is commanded to keep the pitch control (elevator) in the full nose up position. As the aerial vehicle 10 moves to the nose up position the beacons 17 may move out of the imaging sensor's field of view; in which case the recovery control processor 19 uses the last measured parameters for the final control. The following flight parameters are involved during the landing approach:

gamma (γ)=aircraft heading or yaw angle 39
delta gamma (Δγ)=indicates instantaneous change in or to heading angle 39
delta T$_y$ (ΔT$_y$)=along track distance change 43
delta T$_x$ (ΔT$_x$)=cross track distance change 44
beta (β)=pitch angle 53
delta beta (Δβ)=change in pitch angle
alpha (α)=roll angle
delta alpha (Δα)=change in roll angle
FOV (field-of-view)=sensor field of view
delta FOV (ΔFOV)=change in sensor field of view
H=altitude (above touchdown point) 51
delta H (ΔH)=change in altitude The motion compensation processor 18 solves eight equations containing the twelve parameters noted hereinabove. If any four of the above parameters are known, the other eight can be calculated. The sensor field of view (FOV) and any changes thereto are accurately known. In addition, the heading angle 39, and the pitch angle 53, initially set by the ground controller, are known. Thus, the parameters γ, β, FOV, and ΔFOV are known, and the remainder can be calculated by motion compensation processor 18.

In the video image of the landing area as seen by sensor 16, the distance in pixels between the two beacons 17 is measured by motion compensation processor 18. Given this distance, angle 42 that is subtended by the beacons 17 can be calculated as follows:

$$\theta = \frac{P_b(FOV)_h}{P_u} \quad (1)$$

where
Θ=the angle 42 in degrees (FIG. 2B).
P$_b$=pixels between beacons 17—Measured
FOV$_h$=imaging sensor horizontal field of view (degrees)— Known, and
P$_u$=total pixels in imaging sensor (horizontal)—Known.

This horizontal angle is then used to calculate the distance from the imaging sensor 16 to a vertical plane passing through the beacons 17, which is equal to the ground distance from point 54 to the beacons. This calculation is performed by equation 2, as follows:

$$D_t = \frac{D_b}{2\tan\frac{\theta}{2}}$$

wherein,
D$_t$=total distance in feet between point 54 and beacons 17, and
D$_b$=distance in feet between the beacons (known).

The actual altitude 51 is then measured and calculated in motion compensation processor 18 as parameter H, the altitude of vehicle 10 above ground level, which is substantially the same vertical distance above touchdown point 41. The desired altitude 56 at any ground distance from touchdown point 41 is then calculated by the recovery control processor 19. Desired altitude 56 equals the current or instantaneous distance times the sine of the pitch angle 53 (alt.$_{56}$=d$_{54}$tan β). The recovery control processor 19 then compares the actual (instantaneous) altitude 51 and the desired altitude 56. If the desired altitude is less than actual altitude, the autopilot 15 on aerial vehicle 10 is instructed to decrease altitude. If the desired altitude is greater than actual altitude, autopilot 15 is instructed to increase altitude. This comparison and correction process is continuous until just before touchdown.

Directional control of aerial vehicle 10 during an automatic landing is a simple procedure. The direction from the initial approach point 50 to the desired landing area will be known ahead of time and will be one of the approach parameters input to the required position computation circuit 75. For example, if the desired touchdown area is east of point 50, the direction or heading of the air vehicle (γ) will be 90 degrees. Once the approach beacons 17 are centered in the video field of view, the value for Δγ is used as an error in the heading of the air vehicle and will cause the autopilot to yaw (turn) the air vehicle to drive Δγ to zero. If the value of ΔT$_x$ (the cross track distance change 44) becomes nonzero while the value of Δγ is zero, it indicates that there is a disturbance such as a wind from the side blowing the aircraft off course. This condition will cause the automatic pilot to slightly modify the heading angle (by turning into the wind) to offset the disturbance. This revised gamma angle will remain the air vehicle heading angle as long as ΔT$_x$ remains zero. The recovery control processor attempts to keep ΔT$_x$ equal to zero, causing the automatic pilot 15 to command the aerial vehicle 10 to maintain the correct lateral flight path all the way to landing.

Figure 5:
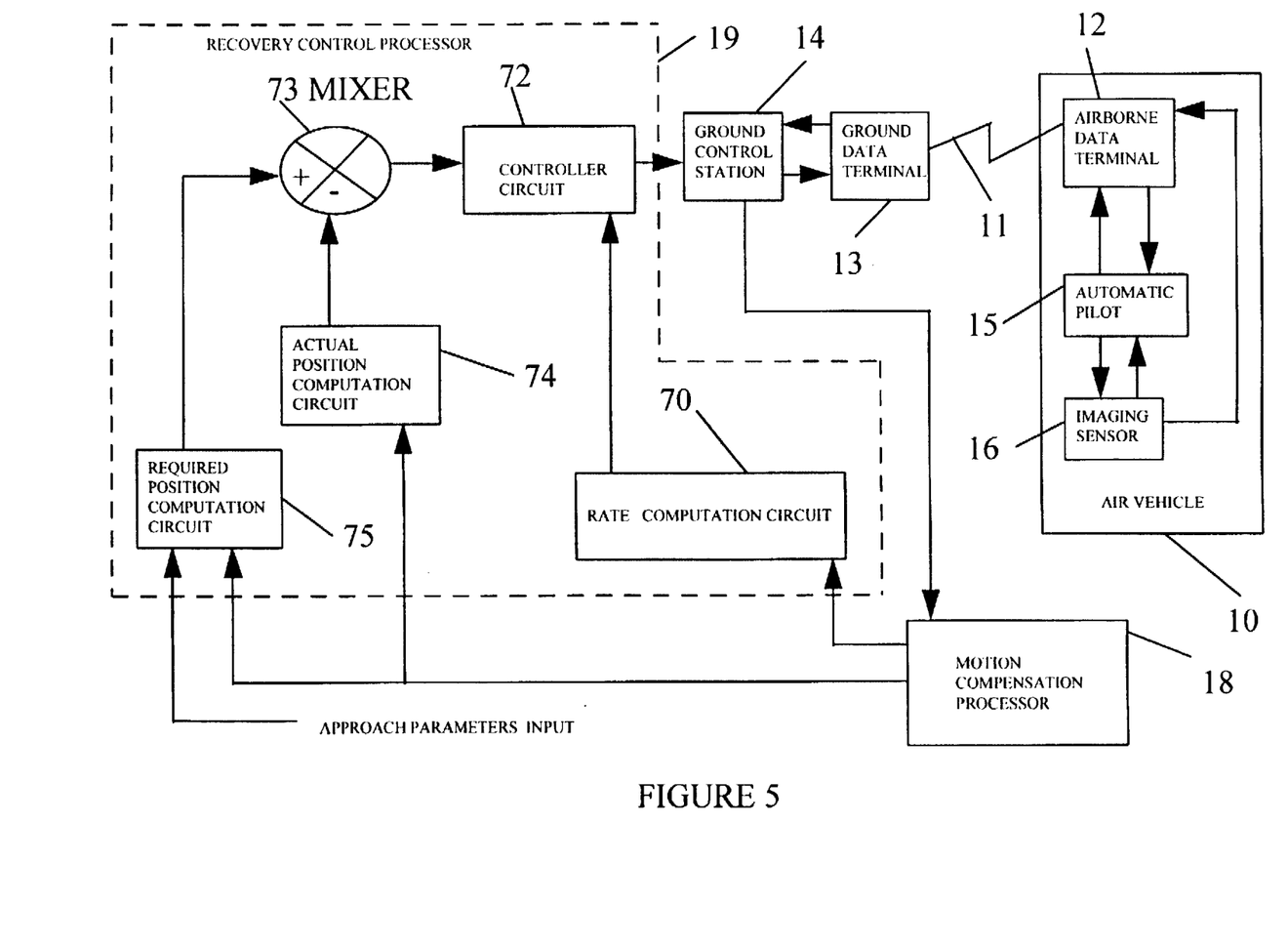
FIG. 5 is a block diagram of the entire automatic landing system of the invention.

FIG. 5 discloses a more detailed block diagram of the landing system as set forth hereinabove with reference also to FIG. 1. In the vehicle 10, automatic pilot 15 receives signals from the data terminal 12 and commands the air vehicle via air vehicle controls (not shown) to fly in accordance with these signals from the recovery control processor. In addition, during the final stages of the landing (transition and touchdown phases 61 and 64), the autopilot commands the sensor gimbals to point the sensor line of sight downward to continue pointing at the beacons as the air vehicle flys over the apparent touchdown point 41. Sensor 16 generates a video image of the beacons and surrounding area and couples this video information to the data terminal 12 for transmission to the motion compensation processor 18 where it is processed to derive the previously described landing parameters. The recovery control processor 19 includes a rate computation circuit 70 coupled to receive an input from motion compensation processor 18 and coupled to provide an output to a controller circuit 72. A mixer 73 is coupled to receive first input signal from actual position computation circuit 74 and from required position computation circuit 75 and provide output signals to controller circuit 72. Motion compensation processor 18 provides input signals to actual position computation circuit 74 and to required position computation circuit 75. Controller 72 provides the recovery control processor 19 output signals that are coupled to control station 14.

At any time prior to the actual landing approach, landing instructional requirements may be manually entered into the system. Position computation circuit 75 accepts the manually entered approach parameters of pitch angle 53, heading or yaw angle 39, vehicle airspeed, the desired altitude 52 at the initial approach point 50, the ground distance from the apparent touchdown point 41 to the initial approach point, and the desired altitude 62 to begin the transition phase 61 (FIG. 4). Circuit 75 also uses the measured/calculated data received from motion compensation processor 18 of the pixel distance between beacons 17, along with the known parameters of predetermined distance between the beacons, field of view of the imaging sensor, and total pixels in the imaging sensor's field of view to calculate the desired altitude 56 at any distance from the apparent touchdown point 41.

The output signals representing these measured parameters go to the differencing means, mixer 73 for comparison with the output of the actual position computations circuit 74. The actual position computations means 74 takes the measured/calculated values—altitude 52, $\Delta\beta$, $\Delta T_x$, $\Delta T_y$, and $\Delta\gamma$—and computes the actual aerial vehicle position, vertically and horizontally, computes the actual ground speed, and then sends these values to the mixer 73. The output of this difference operation from mixer 73 is the deviation of the actual aerial vehicle altitude and heading, from the required values.

This output of the difference operation is then sent to the controller circuit 72 which provides commands via ground control station 14 and data terminal 13 to the automatic pilot 15 causing the aerial vehicle 10 to conform to the desired flight path. Since deviations are measured and corrections performed in a dynamic environment, the controller circuit 72 must contain the necessary filtering or other compensation to allow the proper control of the aerial vehicle 10. This compensation is dependent upon the particular aerial vehicle 10 dynamics and the particular automatic pilot 15 design. For the more sophisticated vehicle 10 and pilot 15, it may be that the rate of change of parameters with respect to time can be used advantageously in the controller means computations. In this case, the rate computation circuit 70 takes the delta, $\Delta$, parameter computations from the motion compensation processor 18. It then creates a smoothed estimate of the parameter changes over time, since a new computation is performed on each new frame of video.

Beacons 17 and sensor 16 must operate in compatible frequency ranges, such as visible for a television system or infrared within the appropriate band for an infrared (IR) sensor. Similarly, sensor 16 may be fixed, pointing or looking straight ahead, but the sensor will normally be movably stabilized on gimbals or a stable platform so that the look angle may be changed by as much as 150–160 degrees as the vehicle approaches the landing site so that the sensor can be moved to point at the beacons during the final stages of the landing (transition and touchdown phases).

It should be noted that from the initial approach point 50 until the transition phase 61 (FIG. 4), the imaging sensor 16 views the same area on the ground. Since the initial acquisition of the beacons 17 is made from a considerable distance, and the transition phase of the landing 61 begins a few meters from the beacons 17, a change in the field of view of the imaging sensor is required. Thus, a narrow field of view is used at the start. As the aerial vehicle 10 closes on the beacons 17 the scene no longer fits within the imaging sensor's field of view. At this point either a manually or automatically initiated zooming out to a wider field of view must occur. The exact point of change is dependent on sensor optics.

Figure 6:
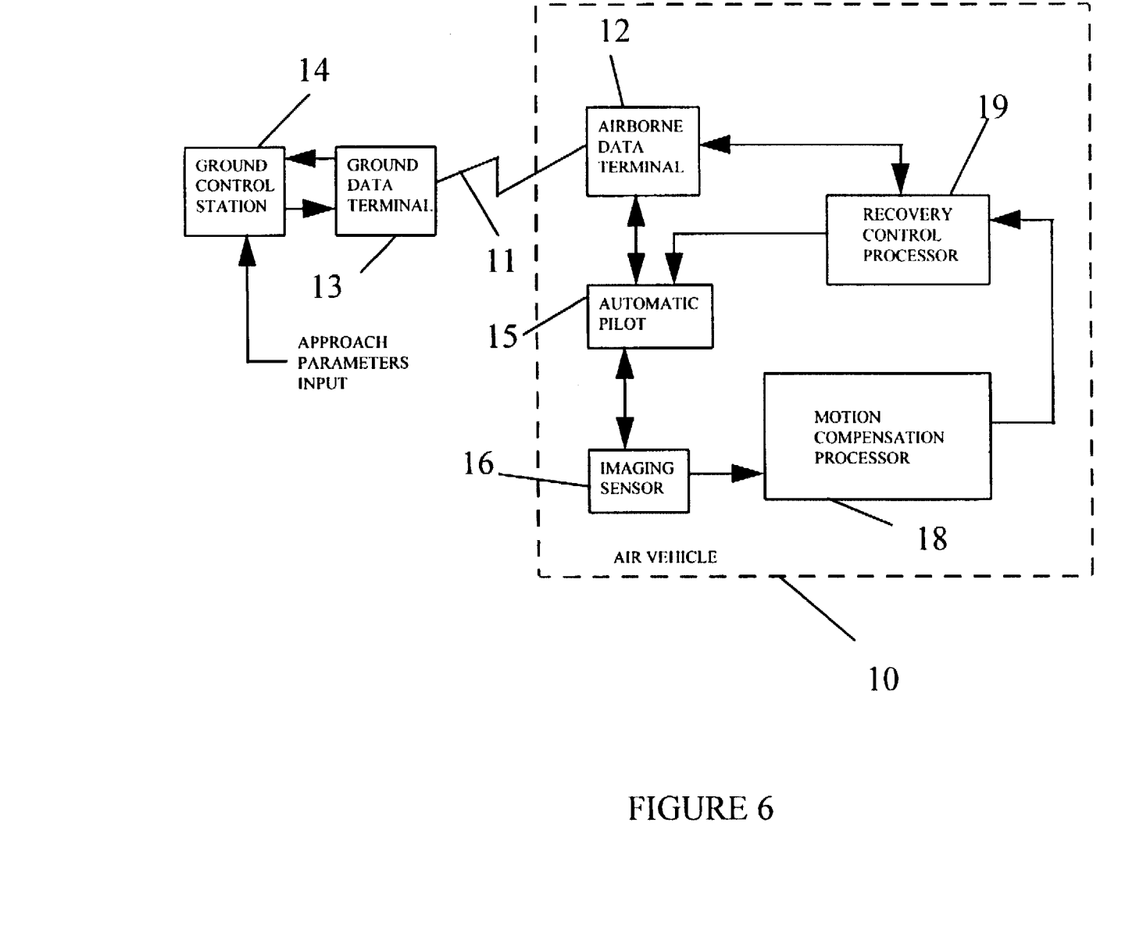
FIG. 6 is a block diagram of the entire automatic landing system of the invention with major components installed in the aerial or air vehicle.

For larger aerial vehicles the motion compensation processor 18 can be onboard the aerial vehicle 10. Thus, the video computations can be performed and commands issued to the autopilot 15 without the delay of sending the video to the ground, and sending the autopilot commands back, via the data link 11. In this event, both the motion compensation processor 18 and the recovery control processor 19 will be contained in the air vehicle. All the functions will be the same, only the packaging will be modified as shown in FIG. 6. Rather than the approach parameter inputs being directly loaded into the required position computation circuit 75 of the recovery control processor 19, they would be loaded via the ground control station 14 and their data link 11, 12, 13. The advantage of this approach is the reduction in time delay that will occur in the data link when sending data from the air vehicle to the ground and back to the air vehicle. In some instances (as with an inadequate data link or ground computer) this may be of advantage in adding this automatic landing system to an existing air vehicle and ground control station in that more stable control of the air vehicle may be possible.

Typical components to implement the automatic landing system are as follows:

| Reference Number | Identification |
| --- | --- |
| 18 | Patent application Ser. No. 08/353,589 filed December 12, 1994 entitled "Optical Flow Detection System", now U.S. Pat. No. 5,627,905 issued May 6, 1997 to Thomas L. Sebok and Dale R. Sebok. |
| 19 | This entire function can be implemented in a one board microcomputer such as an Intel 486DX100 or Pentium P90. |

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A landing system for directing a remotely piloted aerial vehicle to a predetermined point in a landing zone comprising: an autopilot for controlling the flight path of a remotely piloted aerial vehicle; a data terminal coupled to said autopilot for receiving and sending signals both to and from said autopilot, beacons disposed on the ground adjacent said predetermined point in said landing zone, said beacons consisting of first and second beacons, said first and second beacons being spaced a predetermined distance apart in a plane substantially normal to the plane of the line of sight path from an aerial vehicle imaging sensor when said vehicle is on a desired glide path, said first and second beacons and said predetermined point in the landing zone lying on a common line within said plane, and said first and second beacons generating signals aimed in the direction of said vehicle said imaging sensor being disposed in said aerial vehicle and aligned with the longitudinal axis of said vehicle for generating an image of the landing zone which contains said first and second beacons, said sensor receiving said signals generated by the first and second beacons and including the signals in said image of the landing zone; a ground based motion compensation processor for calculating actual vehicle flight parameters and for generating output signals corresponding to said calculated parameters; and a ground based recovery control processor coupled to receive said output signals generated by said motion compensation processor and for comparing said output signals corresponding to the calculated parameters to predetermined flight parameters necessary to land said vehicle at said predetermined point; and said recovery control processor generating correction output signals for transmission to said autopilot data terminal for adjusting the actual vehicle flight parameters to bring said vehicle to a landing within said landing zone.

2. A landing system for directing a remotely piloted aerial vehicle to a predetermined point in a landing zone as set forth in claim 1, wherein said imaging sensor comprises a television camera and said signals generated by said beacons are detected by said television camera.

3. A landing system for directing a remotely piloted aerial vehicle to a predetermined point in a landing zone as set forth in claim 1, wherein said imaging sensor is an infrared sensor and said first and second beacons generate infrared signals, and said predetermined point in the landing zone is centered between said first and second beacons on said common line.

4. A landing system for directing a remotely piloted aerial vehicle to a predetermined point in a landing zone as set forth in claim 1, wherein said motion compensation processor for calculating actual aerial vehicle flight parameters, generates parameters for altitude, changes in altitude, changes in pitch and yaw angles, roll angle and changes in roll angle, and changes in cross range and down range position, said calculated parameters being based on the movement of elements in the video of said imaging sensor onboard the aerial vehicle, and wherein said autopilot adjusts the actual vehicle flight parameters by reducing engine speed to idle and raising the aerial vehicle nose to an attitude whereby the vehicle begins to stall and the actual altitude begins to decrease independently of any control movement by the autopilot, bringing said vehicle to a landing.

5. A landing system for directing a remotely piloted aerial vehicle to a predetermined point in a landing zone, comprising:

an autopilot for controlling the flight path of a remotely piloted aerial vehicle;

a data terminal coupled to said autopilot for receiving and sending signals both to and from said autopilot;

beacons disposed on the ground adjacent said predetermined point in said landing zone, said beacons consisting of first and second beacons defining a line therebetween, wherein said predetermined point is centered between said beacons on said line, said beacons being spaced a predetermined distance apart in a plane substantially normal to the plane of the line of sight path from an aerial vehicle imaging sensor when said vehicle is on a desired glide path, and said beacons generating signals aimed in the direction of said vehicle;

said imaging sensor being disposed in said aerial vehicle and aligned with the longitudinal axis of said vehicle for generating an image of the landing zone which contains said beacons, said sensor receiving said beacon generated signals and including the signals in said image of the landing zone;

a motion compensation processor for calculating actual vehicle flight parameters, and for generating output signals corresponding to said calculated parameters; said motion compensation processor taking sequential video images from the imaging sensor, evaluating the movement of individual pixels, and calculating the overall movement of the imaging sensor during the elapsed time between the sequential video images; and a recovery control processor coupled to receive said output signals generated by said motion compensation processor and for comparing said output signals corresponding to the calculated parameters to predetermined flight parameters necessary to land said vehicle at said predetermined point; and said recovery control processor generating correction output signals for coupling to said autopilot for adjusting the actual vehicle flight parameters to bring said vehicle to a landing within said landing zone, and wherein said auto adjusts the actual vehicle flight parameters to bring said vehicle to a landing by reducing engine speed to an idle and by stalling the vehicle by raising the nose to an attitude whereby the vehicle altitude begins to decrease independently of any control movement by the autopilot.

* * * * *